US006453308B1

(12) United States Patent
Zhao et al.

(10) Patent No.: US 6,453,308 B1
(45) Date of Patent: Sep. 17, 2002

(54) NON-LINEAR DYNAMIC PREDICTIVE DEVICE

(75) Inventors: Hong Zhao, Mars; Guillermo Sentoni; John P. Guiver, both of Pittsburgh, all of PA (US)

(73) Assignee: Aspen Technology, Inc., Cambridge, MA (US)

( * ) Notice: Subject to any disclaimer, the term of this patent is extended or adjusted under 35 U.S.C. 154(b) by 0 days.

(21) Appl. No.: 09/160,128

(22) Filed: Sep. 24, 1998

Related U.S. Application Data

(60) Provisional application No. 60/060,638, filed on Oct. 1, 1997.

(51) Int. Cl.[7] ................................................. G06N 3/02
(52) U.S. Cl. ........................................... 706/21; 702/24
(58) Field of Search ................................. 706/21; 702/24

(56) References Cited

U.S. PATENT DOCUMENTS 5,535,135 A * 7/1996 Bush et al. .................... 702/24
5,659,667 A    8/1997 Buescher et al. ............. 395/23

FOREIGN PATENT DOCUMENTS

WO     WO 97/28669     8/1997

OTHER PUBLICATIONS

Korn, Granino A., Neural Networks and Fuzzy–Logic Control on Personal Computers and Workstations, The MIT Press, 1995, pp. 252–253, Jan. 1995.*

Bishop, C.M., *Neural Networks for Pattern Recognition*, Oxford University Press (1995) p. 137–146.

Boyd, S. and L. Chua, "Fading Memory and the Problem of Approximating Nonlinear Operators with Volterra Series," *IEEE Trans. on Circuits and Systems*, 32:11, p. 1150–1161 (Nov. 1985).

Graettinger, T.J., et al., "Model Predictive Control Using Neural Networks," *The AIChE 1994 Spring National Meeting* (1994).

Qin, S.J. and Badgwell, T.J., "An Overview of Industrial Model Predictive Control Technology," *Preprinits of CPS–V*, Tahoe, Jan. 7–12, 1996, p. 1–31.

Sentoni, G., et al., "Approximate Models for Nonlinear Process Control," *AIChE Journal:* 42(8) p. 2240–2250 (1996).

Su, H. et al., "Long–Term Predictions of Chemical Processes Using Recurrent Neural Networks: A Parallel Training Approach," *I&EC Research* 31(5), p. 1338–1352 (1992).

Werbos, P., "Forms of Backpropagation for Sensitivity Analysis, Optimization, and Neural Networks," *The Roots of Back Propagation: From Ordered Derivatives to Neural Networks and Political Forecasting*, p. 256–262, John Wiley and Sons (1994).

Zhao, H. et al., "NeuCOP II: A Nonlinear Multivariable Process Modeling, Control and Optimization Package," *AIChE 1997 Spring National Meeting*, Houston, Texas (1997).

Kolmogorov, A.N. and S.V. Fomin, *Introductory Real Analysis*, pp. 1–49, Dover Publications, Inc., New York (1980).

G. Sentoni et al., "On the Evaluation of a Certain Kind of Approximation Structure," *Latin American Applied Research*, 25–S:35–40 (1995).

Katebi, M. R. and Johnson, M.A., "Predictive Control Design for Large Scale Systems," *Integrated Systems Engineering. A Postprint Volume from the IFAC Conference*, pp. 47–52, Sep. 27, 1994.

Gibbs, B.P. and Weber, D.S., "Nonlinear Model predictive Control for Fossil Power Plants," *Proc. 1992 American Control Conference*, 4:3901–3098, Jun. 24, 1992.

* cited by examiner

*Primary Examiner*—Kakali Chaki
*Assistant Examiner*—Wilbert Starks
(74) *Attorney, Agent, or Firm*—Hamilton, Brook, Smith & Reynolds, P.C.

(57) ABSTRACT

A non-linear dynamic predictive device (60) is disclosed which operates either in a configuration mode or in one of three runtime modes: prediction mode, horizon mode, or reverse horizon mode. An external device controller (50) sets the mode and determines the data source and the frequency of data. In prediction mode, the input data are such as might be received from a distributed control system (DCS) (10) as found in a manufacturing process; the device controller ensures that a contiguous stream of data from the DCS is provided to the predictive device at a synchronous discrete base sample time. In prediction mode, the device controller operates the predictive device once per base sample time and receives the output from the predictive device through path (14). In horizon mode and reverse horizon mode, the device controller operates the predictive device additionally many times during base sample time interval. In horizon mode, additional data is provided through path (52). In reverse horizon mode data is passed in a reverse direction through the device, utilizing information stored during horizon mode, and returned to the device controller through path (66). In the forward modes, the data are passed to a series of preprocessing units (20) which convert each input variable (18) from engineering units to normalized units. Each preprocessing unit feeds a delay unit (22) that time-aligns the input to take into account dead time effects such as pipeline transport delay. The output of each delay unit is passed to a dynamic filter unit (24). Each dynamic filter unit internally utilizes one or more feedback paths that are essential for representing the dynamic information in the process. The filter units themselves are configured into loosely coupled subfilters which are automatically set up during the configuration mode and allow the capability of practical operator override of the automatic configuration settings. The outputs (28) of the dynamic filter units are passed to a non-linear analyzer (26) which outputs a value in normalized units. The output of the analyzer is passed to a post-processing unit (32) that converts the output to engineering units. This output represents a prediction of the output of the modeled process. In reverse horizon mode, a value of 1 is presented at the output of the predictive device and data is passed through the device in a reverse flow to produce a set of outputs (64) at the input of the predictive device. These are returned to the device controller through path (66). The purpose of the reverse horizon mode is to provide essential information for process control and optimization. The precise operation of the predictive device is configured by a set of parameters. that are determined during the configuration mode and stored in a storage device (30). The configuration mode makes use of one or more files of training data (48) collected from the DCS during standard operation of the process, or through structured plant testing. The predictive device is trained in four phases (40, 42, 44, and 46) corresponding respectively to components 20/32, 22, 24 and 26. The importance of this predictive device is that it is shown to approximate a large class of non-linear dynamic processes. The structure of the predictive device allows it to be incorporated into a practical multivariable non-linear Model Predictive Control scheme, or used to estimate process properties.

53 Claims, 11 Drawing Sheets

NON-LINEAR DYNAMIC PREDICTIVE DEVICE

RELATED APPLICATION

This application claims the benefit of U.S. Provisional Application No. 60/060,638 filed Oct. 1, 1997, the contents of which are incorporated herein by reference in their entirety.

I. FIELD OF THE INVENTION

The present invention pertains to a predictive device that models the dynamic input/output relationships of a physical process, particularly in the process industries such as hydrocarbons, polymers, pulp and paper, and utilities. The predictive device is primarily for multivariable process control, but is also applicable to dynamic process monitoring, or to provide a continuous stream of inferred measurements in place of costly or infrequent laboratory or analyzer measurements.

II. BACKGROUND OF THE INVENTION

Most existing industrial products designed for multivariable model predictive control (MPC) employ linear step-response models or finite impulse response (FIR) models. These approaches result in over-parameterization of the models (Qin and Badgwell, 1996). For example, the dynamics of a first order single input/single output SISO process which can be represented with only three parameters (gain, time constant and dead-time) in a parametric form typically require from 30 to 120 coefficients to describe in a step-response or FIR model. This over-parameterization problem is exacerbated for non-linear models since standard non-parametric approaches, such as Volterra series, lead to an exponential growth in the number of parameters to be identified. An alternative way to overcome these problems for non-linear systems is the use of parametric models such as input-output Nonlinear Auto-Regressive with eXogenous inputs (NARX). Though NARX models are found in many case-studies, a problem with NARX models using feed forward neural networks is that they offer only short-term predictions (Su, et al, 1992). MPC controllers require dynamic models capable of providing long-term predictions. Recurrent neural networks with internal or external feedback connections provide a better solution to the long-term prediction problem, but training such models is very difficult.

The approach described in (Graettinger, et al, 1994) and (Zhao, et al, 1997) provides a partial solution to this dilemma. The process model is identified based on a set of decoupled first order dynamic filters. The use of a group of first order dynamic filters in the input layer of the model enhances noise immunity by eliminating the output interaction found in NARX models. This structure circumvents the difficulty of training a recurrent neural network, while achieving good long-term predictions. However, using this structure to identify process responses that are second order or higher can result in over sensitive coefficients and in undesirable interactions between the first order filters. In addition, this approach usually results in an oversized model structure in order to achieve sufficient accuracy, and the model is not capable of modeling complex dynamics such as oscillatory effects. In the single input variable case, this first order structure is a special case of a more general nonlinear modeling approach described (Sentoni et al., 1996) that is proven to be able to approximate any discrete, causal, time invariant, nonlinear SISO process with fading memory. In this approach a Laguerre expansion creates a cascaded configuration of a low pass and several identical band pass first order filters. One of the problems of this approach is that may it require an excessively large degree of expansion to obtain sufficient accuracy. Also, it has not been known until now how to extend this methodology in a practical way to a multi-input system.

This invention addresses many essential issues for practical non-linear multivariable MPC. It provides the capability to accurately identify non-linear dynamic processes with a structure that has close to minimum parameterization can be practically identified with sufficient accuracy makes good physical sense and allows incorporation of process knowledge can be proven to identify a large class of practical processes can provide the necessary information for process control

III SUMMARY OF THE INVENTION

The present invention is a dynamic predictive device that predicts or estimates values of process variables that are dynamically dependent on other measured process variables. This invention is especially suited to application in a model predictive control (MPC) system. The predictive device receives input data under the control of an external device controller. The predictive device operates in either configuration mode or one of three runtime modes—prediction mode, horizon mode, or reverse horizon mode.

The primary runtime mode is the prediction mode. In this mode, the input data are such as might be received from a distributed control system (DCS) as found in a manufacturing process. The device controller ensures that a contiguous stream of data from the DCS is provided to the predictive device at a synchronous discrete base sample time. The device controller operates the predictive device once per base sample time and receives the prediction from the output of the predictive device.

After the prediction mode output is available, the device controller can switch to horizon mode in the interval before the next base sample time. The predictive device can be operated many times during this interval and thus the device controller can conduct a series of experimental scenarios in which a sequence of input data can be specified by the device controller. The sequence of input data can be thought of as a data path the inputs will follow over a forward horizon. The sequence of predictions at the output of the controller is a predicted output path over a prediction horizon and is passed to the device controller for analysis, optimization, or control. The device controller informs the predictive device at the start of an experimental path and synchronizes the presentation of the path with the operation of the device. Internally, horizon mode operates exactly the same way as prediction mode, except that the dynamic states are maintained separately so that the predictive device can resume normal prediction mode operation at the next base sample time. In addition, the outputs of the filter units are buffered over the course of the path and are used during reverse horizon operation of the device.

The purpose of reverse horizon mode is to obtain the sensitivities of the predictive device to changes in an input path. Reverse horizon mode can only be set after horizon mode operation has occurred. The device controller first informs the predictive device the index of the point in the output path for which sensitivities are required. The device controller then synchronizes the reverse operation of the predictive device with the output of sensitivity data at the input paths of the device.

In forward operation, each input is scaled and shaped by a preprocessing unit before being passed to a corresponding delay unit which time-aligns data to resolve dead time effects such as pipeline transport delay. Modeling dead-times is an important issue for an MPC system. In practical MPC, prediction horizons are usually set large enough so that both dynamics and dead-time effects are taken into account; otherwise the optimal control path may be based on short term information, and the control behavior may become oscillatory or unstable. In the preferred embodiment, the predictive device is predicting a single measurement, and the dead-time units align data relative to the time of that measurement. If predictions at several measurement points are required, then several predictive devices are used in parallel. During configuration mode, the dead times are automatically estimated using training data collected from the plant. In the preferred embodiment the training method consists of constructing individual autoregressive models between each input and the output at a variety of dead-times, and choosing the dead time corresponding to the best such model. As with other components of the invention, manual override of the automatic settings is possible and should be used if there is additional process knowledge that allows a more appropriate setting.

Each dead time unit feeds a dynamic filter unit. The dynamic filter units are used to represent the dynamic information in the process. Internally the dynamic filter units recursively maintain a vector of states. The states derive their values from states at the previous time step and from the current input value. This general filter type can be represented by what is known to those skilled in the art as a discrete state space equation. The preferred embodiment imposes a much-simplified structure on the filter unit that allows for fast computation for MPC and also allows intelligent override of the automatic settings. This simplified structure is composed of first and second order loosely coupled subfilters, only one of which receives direct input from the corresponding delay unit. The practical identification of this filter structure is an essential part of this invention.

The outputs of the dynamic filter units are passed to a non-linear analyzer that embodies a static mapping of the filter states to an output value. The exact nature of the non-linear analyzer is not fundamental to this invention. It can embody a non-linear mapping such as a Non-linear Partial Least Squares model or a Neural Network, or a hybrid combination of linear model and non-linear model. The preferred embodiment makes use of a hybrid model. The reason for this is that a non-parametric non-linear model identified from dynamic data (such as a neural net) cannot, by its nature, be fully analyzed and validated prior to use. The non-linearity of the model means that different dynamic responses will be seen at different operating points. If the process being modeled is truly non-linear, these dynamic responses will be an improvement over linear dynamic models in operating regions corresponding to the training data, but may be erroneous in previously unseen operating regions. When the non-linear model is used within the context of MPC, erroneous responses, especially those indicating persistent and invalid gain reversals can create instabilities in the MPC controller. With a hybrid approach, a non-linear model is used to model the errors between the linear dynamic model and the true process. The hybrid dynamic model is a parallel combination of the linear dynamic model with the error correction model. The dynamic response of the linear model can be analyzed completely prior to use, since the gains are fixed and independent of the operating point. The process engineer can examine and approve these gains prior to closing the loop on the process and is assured of responses consistent with the true process. However, the linear dynamic response will be sub-optimal for truly non-linear processes. In online operation of the hybrid model within an MPC framework, the responses of the linear model and the hybrid model can be monitored independently and compared. In operating regions where the non-linear model shows persistently poor response, control can be switched, either automatically or by the operator, back to the safety of the linear model.

The output of the non-linear analyzer is passed through a postprocessing unit that converts the internal units to engineering units.

The importance of this invention is that its structure is shown to be able to approximate a large class of non-linear processes (any discrete, causal, time invariant, nonlinear multi-input/single output (MISO) process with fading memory), but is still simple enough to allow incorporation of process knowledge, is computationally fast enough for practical non-linear MPC, and can be configured with sufficient accuracy in a practical manner.

IV BRIEF DESCRIPTION OF THE DRAWINGS

The textual description of the present invention makes detailed reference to the following drawings.

V DETAILED DESCRIPTION OF THE PREFERRED EMBODIMENTS

Figure 1:
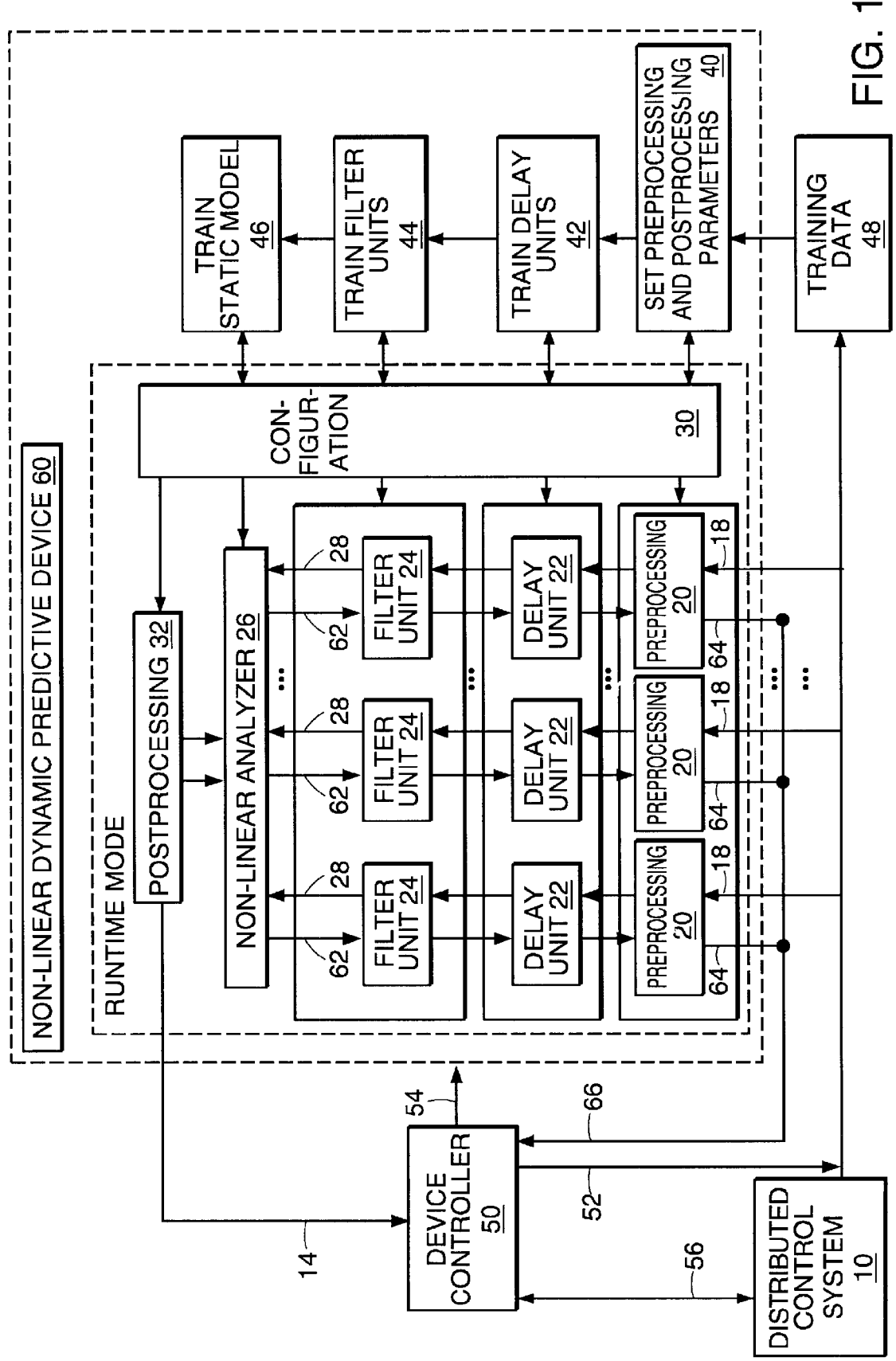
FIG. 1 is an overall block diagram of the invention showing both the runtime and training components.

FIG. 1 is an overall block diagram of the invention and its context. An external device controller (50) synchronizes the flow of data to and from the predictive device via the data paths (18), (14), and (64). The device controller also controls the mode of operation and the path stepping of the predictive device via the control path (54). The external device controller may also communicate with a DCS (10) or other data/control system both for requesting data and for requesting control changes to the modeled process; however the exact external context and configuration of the device controller is beyond the scope of this application.

V.1 Forward Runtime Operation of the Prediction Device

The figures and equations in this detailed description refer to an index k that represents a data point in a sequence of data points. This index has different meanings depending on whether the forward operational mode of the device is prediction mode or horizon mode.

In prediction mode data is provided at a regular sampling interval $\Delta t$ to the input nodes (18) of the device. Data is passed in a forward direction through the device. For simplicity of notation, the sample point $T_0+k\Delta t$ is denoted by the index k.

In horizon mode, a sequence of data representing a forward data path is provided to the inputs. This data path may represent a proposed path for manipulated variables for process control purposes, or may represent a holding of the inputs to constant values in order to determine the steady state output of the device. The starting point of this path is taken to be the most recent input sample provided in prediction mode. Index 0 represents this starting point and index k represents the $k^{th}$ data point in this path.

V.1.1 Forward Runtime Operation of a Preprocessing Unit

Each input feeds a preprocessing unit (20) which is used to convert the engineering units of each data value to a common normalized unit whose lower and upper limits are, by preference, −1 and 1 respectively, or 0 and 1 respectively.

Figure 2:
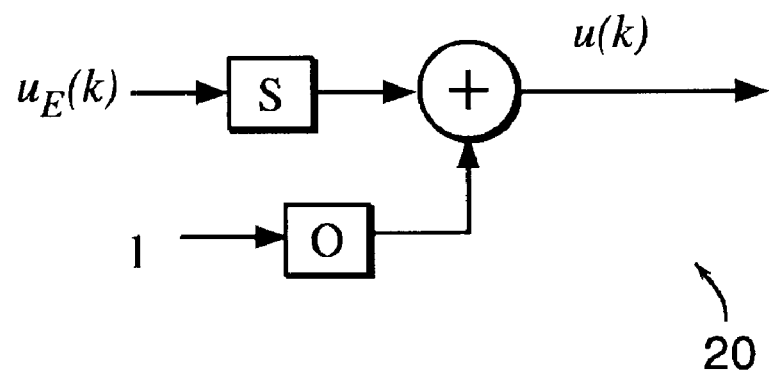
FIG. 2 shows the runtime structure of an individual preprocessing unit.

The preprocessing unit can also shape the data by passing it through a non-linear transformation. However, the preferred embodiment uses a simple scale and offset as shown in FIG. 2 and equation (1):

$$u(k)=su_E(k)+o \tag{1}$$

where $u_E(k)$ is the value of an input in engineering units, and $u(k)$ is the preprocessed value in normalized units. The scale and offset values as stored in the configuration file (30—FIG. 1) are, in general, different for each input variable, and are determined in the configuration mode.

V.1.2 Forward Runtime Operation of a Delay Unit

Figure 3:
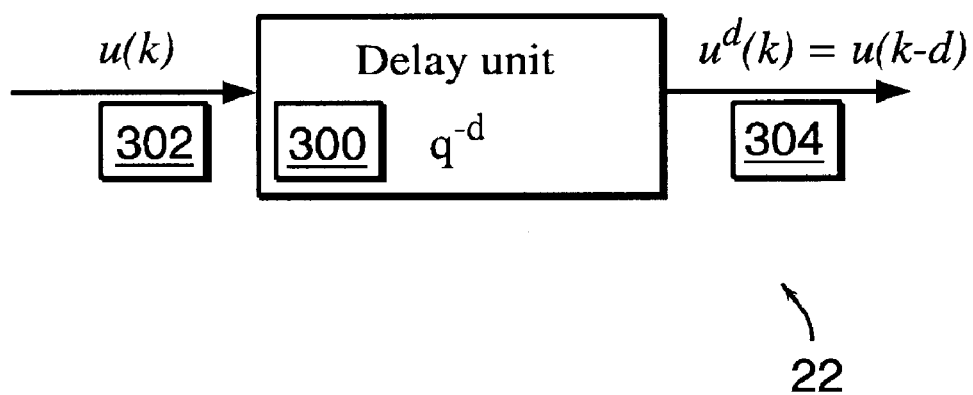
FIG. 3 shows the runtime structure of an individual delay unit.

Data flows from each preprocessing unit to a corresponding delay unit (22). The forward run-time operation of the delay unit (22) is shown in FIG. 3 and equation (2). The output $u^d(k)$ (304) of an individual delay unit (300) is equal to the input u(k) (302) delayed by d sample times. The value of d may be different for each delay unit (22) and is retrieved from the configuration file (30—FIG. 1). This may be implemented as a shift register with a tap at the $d^{th}$ unit.

$$u^d(k)=u(k-d) \tag{2}$$

This equation can also be written in terms of the unit delay operator $q^{-1}$:

$$u^d(k)=q^{-d}u(k)$$

V.1.3 Forward Runtime Operation of the Filter Units

Figure 4:
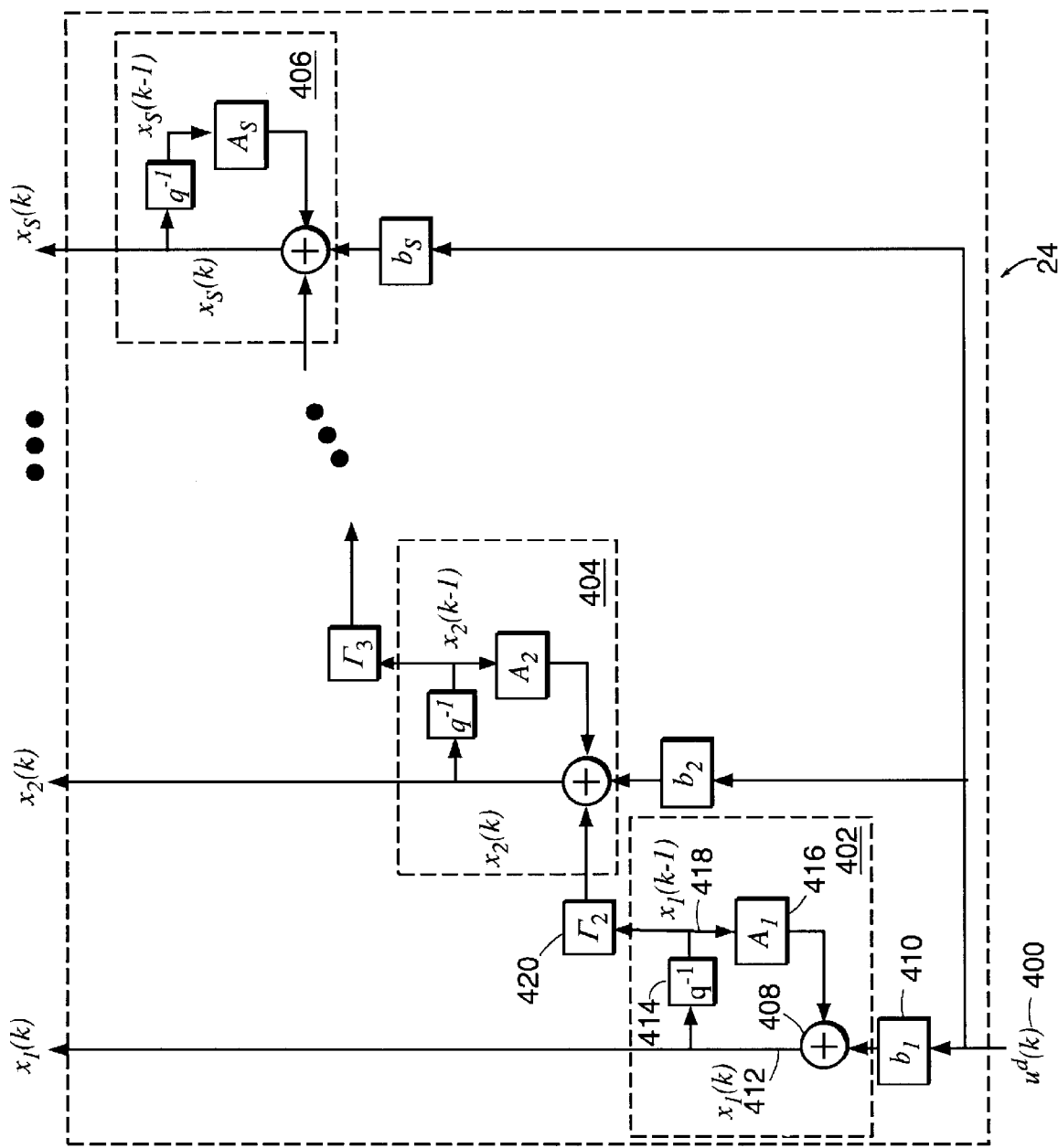
FIG. 4 shows the forward flow internal decomposition of an individual filter unit into cascaded subfilter units.

Referring again to FIG. 1, each delayed input value is passed to an individual filter unit (24). The general internal feedforward structure of a filter unit (24) is shown in FIG. 4. The general feedforward structure is composed of S cascaded subfilters (402, 404, ..., 406). The first subfilter in the cascade (400) is referred to as the primary subfilter. Non-primary subfilters are referred to as secondary subfilters. All the subfilters are alike except that the primary subfilter receives no input from another subfilter, and the final subfilter sends no output to another subfilter. Now the general form of the primary subfilter will be described in detail.

The primary subfilter maintains a vector (412) of states $x_1(k)$ at each time k. An internal single time step delay unit (414) feeds the vector state to a coupling unit (420) and to a matrix unit (416). The matrix unit converts the delayed state vector (418) and feeds it to a vector addition unit (408). The input to the filter unit $u^d(k)$ is expanded and linearly scaled by the input coupling unit (410) to a vector of values of the same dimension as the state vector. The vector addition unit then combines its two input streams to produce the vector of states for the current time. The operation just described for the primary subfilter is conveniently described in mathematical matrix and column vector notation as:

$$x_1(k)=A_1x_1(k-1)+b_1u^d(k) \tag{3}$$

Such an equation is known, to those skilled in the art, as a linear state space equation with a single input. If no structure is imposed on $A_1$ or $b_1$, then further subfilters are unnecessary since the cascaded subfilter structure can subsumed into a single complicated primary subfilter. However, the preferred subfilter structures as described below, or similar to those described below, are essential for a practical embodiment and application of the invention.

The subfilter coupling unit (420) determines how state values at time k−1 affect the state units in the next subfilter at time k. In mathematical terms, the subfilter coupling unit uses the coupling matrix $\Gamma_2$ to perform a linear transformation of state vector $x_1(k-1)$ which is passed to the vector addition unit of the next subfilter. The operation of a secondary subfilter is conveniently described in mathematical matrix and vector notations as:

$$x_s(k)=A_sx_s(k-1)+\Gamma_sx_{s-1}(k-1)+b_su^d(k) \tag{4}$$

Figure 5:
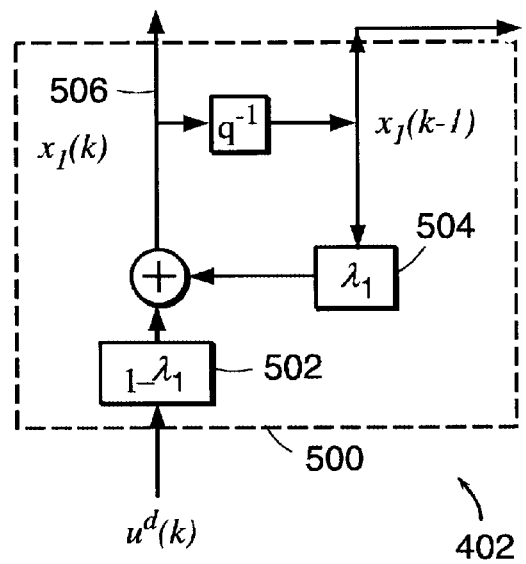
FIG. 5 shows the preferred forward flow structure of a primary first order subfilter unit.

In the preferred embodiment, the subfilters are all of first or second order. A first order subfilter maintains just one state. The preferred embodiment for a first order primary subfilter (500) is shown in FIG. 5. The vectorizing unit (502) and the matrix unit (504) collapse to become scaling operations so that the state vector (506) is represented by:

$$x_1(k)=\lambda_1x_1(k-1)+(1-\lambda_1)u^d(k) \tag{5}$$

Figure 6:
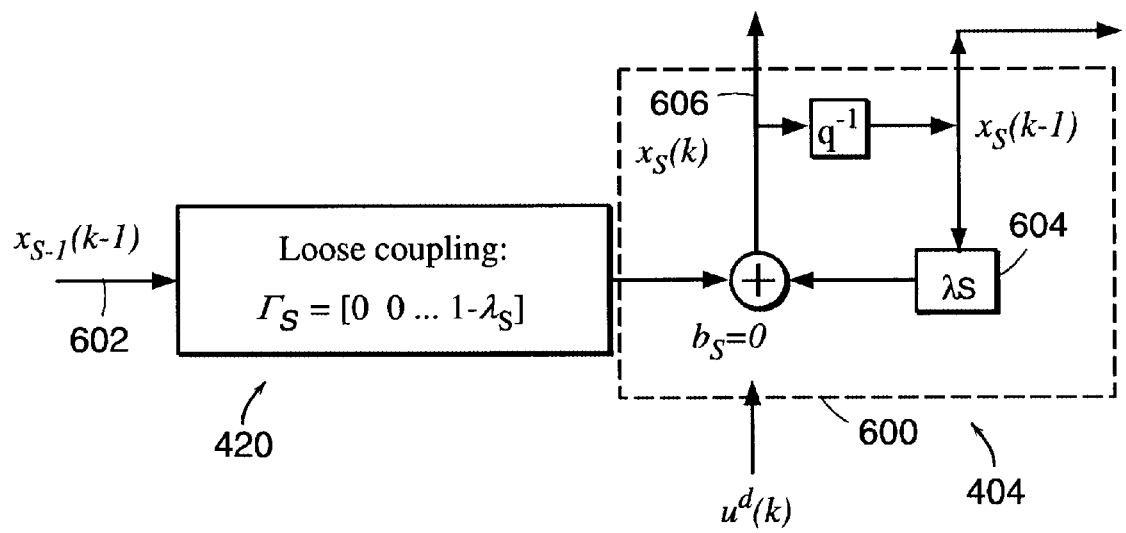
FIG. 6 shows the preferred forward flow structure of a secondary first order subfilter unit and the preferred coupling with the previous subfilter in the cascade.

The preferred embodiment for a first order secondary subfilter (600) is shown in FIG. 6. The secondary subfilter receives no direct input, but instead receives cascaded input from the previous subfilter. The preferred coupling is a loose coupling scheme (602) in which only the last state component of the previous subfilter contributes. Note that the previous subfilter is not required to be a first order subfilter. The state vector (606) is represented by:

$$x_s(k)=\lambda_sx_s(k-1)+(1-\lambda_s)x_{s-1,last}(k-1) \tag{6}$$

where the matrix unit $\lambda_s$ (604) is a scalar.

Figure 7:
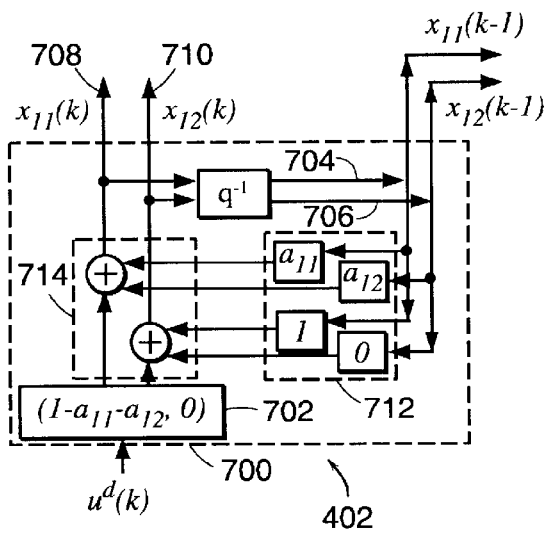
FIG. 7 shows the preferred forward flow structure of a primary second order subfilter unit.

Second order subfilters maintain two states. The preferred embodiment for a second order primary subfilter (700) is shown in FIG. 7. In this figure, the state vector $x_1(k)$ is shown in terms of its two components $x_{11}(k)$ (708) and $x_{12}(k)$ (710). The vectorizing unit (702) creates two inputs to the vector addition unit (714), the second of which is fixed at zero. The delayed states (704) and (706) are fed to the matrix unit (712) whose outputs are also fed to the vector addition unit (712) which adds the matrix transformed states to the vectorized inputs producing the current state. Note that due to the (1,0) structure of the second matrix row, and the zero second component of the vectorizing unit component, the current second state component (710) is just equal to the delayed first component (704):

$$x_{11}(k)=a_{11}x_{11}(k-1)+a_{12}x_{12}(k-1)+(1-a_{11}-a_{12})u^d(k)x_{12}(k)=x_{11}(k-1) \quad (7)$$

Figure 8:
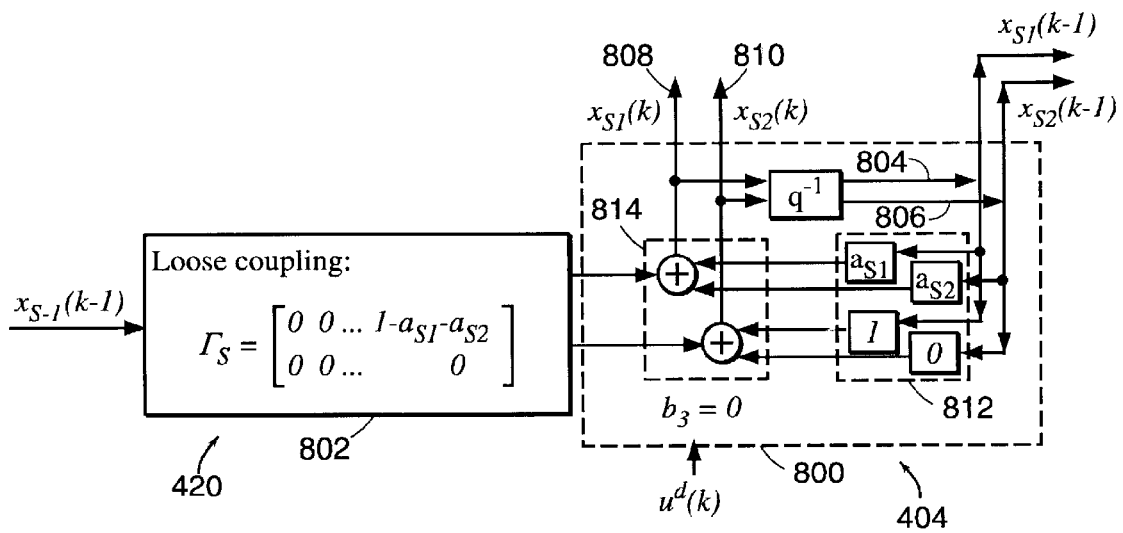
FIG. 8 shows the preferred forward flow structure of a secondary second order subfilter unit and the preferred coupling with the previous subfilter in the cascade.

The preferred embodiment for a second order secondary subfilter (800) is shown in FIG. 8. In this figure, the state vector $x_s(k)$ is shown in terms of its two components $x_{s1}(k)$ (808) and $x_{s2}(k)$ (810). The preferred coupling with the previous subfilter unit is a loose coupling scheme (802) in which only the last state component of the previous subfilter contributes to the first state component of the current subfilter. Note that the previous subfilter is not required to be a first order subfilter or second order subfilter. The output of the coupling unit is fed to the addition unit (814). The delayed states (804) and (806) are fed to the state matrix unit (812) whose outputs are also fed to the vector addition unit (812) which adds the state matrix transformed states to the output of the coupling unit, producing the current state. Note that due to the (1,0) structure of the second state matrix row, and the zero second row of the coupling matrix, the current second state component (810) is just equal to the delayed first component (804):

$$x_{s1}(k)=a_{s1}x_{s1}(k-1)+a_{s2}x_{s2}(k-1)+(1-a_{s1}-a_{s2})x_{s-1,last}(k-1)x_{s2}(k)=x_{s1}(k-1) \quad (8)$$

If the device is operating in horizon mode current states along the path are maintained in a separate storage area so as not to corrupt the prediction mode states. In horizon mode, k indexes the input path and the states are initialized at the start of the path (k=0) to the prediction mode states. In addition the states at the output of the filter unit are buffered for use in reverse horizon mode.

V.1.4 Forward Runtime Operation of the Non-Linear Analyzer

Figure 9:
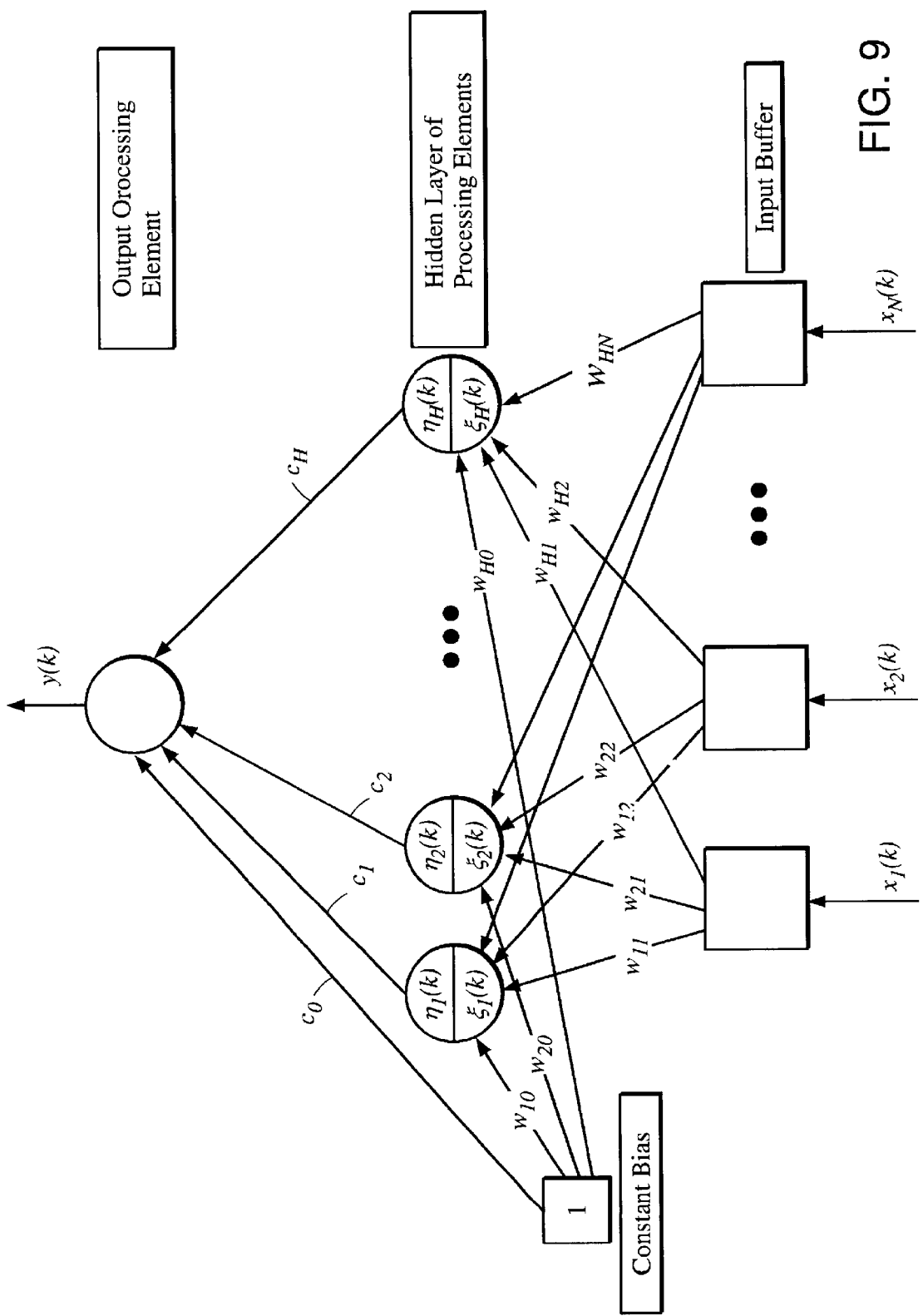
FIG. 9 shows a typical feedforward configuration of the non-linear analyzer.

Referring again to FIG. 1, the outputs (28) of the filter units (24) provide input to the non-linear analyzer (26). The exact structure and configuration of the non-linear analyzer (26) is not central to this application. It is the interaction of the non-linear analyzer (26) with the filter units (24), and the operation and configuration of the filter units (24) that forms the core of this invention. The preferred embodiment, for reasons discussed in the summary of the invention is a hybrid parallel combination of linear and non-linear. However, for clarity of explanation, a standard neural network structure is described which is well known to those skilled in the art. This structure is shown in FIG. 9. The equations for this structure are:

$$\xi_h(k) = w_{h0} + \sum_{i=1}^{N} w_{hi}x_i(k) \quad (9)$$

$$\eta_h(k) = \tanh(\xi_h(k))$$

$$y(k) = \sum_{h=1}^{H} c_h\eta_h(k)$$

V.1.5 Forward Runtime Operation of the Postprocessing Unit

The postprocessing unit (32) in FIG. 1 is used to scale the output from the normalized units to engineering units. The postprocessing unit can also shape the data by passing it through a non-linear transformation. However, the preferred embodiment uses a simple scale and offset. For consistency with the preprocessing units, the scale and offset represent the mapping from engineering units to normalized units.

$$y_E(k) = \frac{1}{s}y(k) - \frac{o}{s} \quad (10)$$

The scale and offset values as stored in the configuration file (30—FIG. 1) and are determined in the configuration mode.

V.2 Reverse Runtime Operation of the Prediction Device

The reverse horizon mode of operation is only allowed immediately following horizon mode operation. Horizon mode operation buffers the states (28) output by the filter units (24) over the course of the forward path. The purpose of reverse horizon mode is to obtain the sensitivity of any point y(k) of the prediction path (output by the device in horizon mode) with respect to any point in the input path u(l).

In order to use the invention for process control applications, the mathematical derivatives of the prediction with respect to the inputs are required. The mathematical derivatives measure how sensitive a state is in response to a small change in an input. The dynamic nature of the predictive device means that a change in input at time k will start to have an effect on the output as soon as the minimum dead-time has passed and will continue to have an effect infinitely into the future. In most practical applications systems are identified to have fading memory so that the effect into the future recedes with time. For MPC applications the aim is to plan a sequence of moves for the inputs corresponding to manipulated variables (MVs). The effect of these moves needs to be predicted on the controlled variables (CVs) along a prediction path. A constrained optimization algorithm is then used to find the move sequences that predict an optimal prediction path according to some desired criteria.

In reverse horizon mode, the external device controller specifies the output path index k. The device then outputs in sequence the sensitivities (64) in reverse order at the input nodes of the device. In the detailed description below, the sensitivity of the output $y_E(k)$ of the device with respect to any variable v is represented by $\Omega_k v$. It is this sensitivity value, rather than an external data value that is fed back through the device when operating in reverse horizon mode.

V.2.1 Reverse Runtime Operation of the Postprocessing Unit

The reverse operation of the postprocessing unit (32) is to scale data received at its output node using the inverse of the feedforward scaling shown in equation (10):

$$\Omega_k y(k)=s\Omega_k y_E(k) \quad (11)$$

Since the sensitivity of the output with respect to itself is:

$$\Omega_k y_E(k)=1 \quad (12)$$

the postprocessing unit always receives the value of 1 at its output node in reverse operation.

V.2.2 Reverse Runtime Operation of the Non-Linear Analyzer

Figure 10:
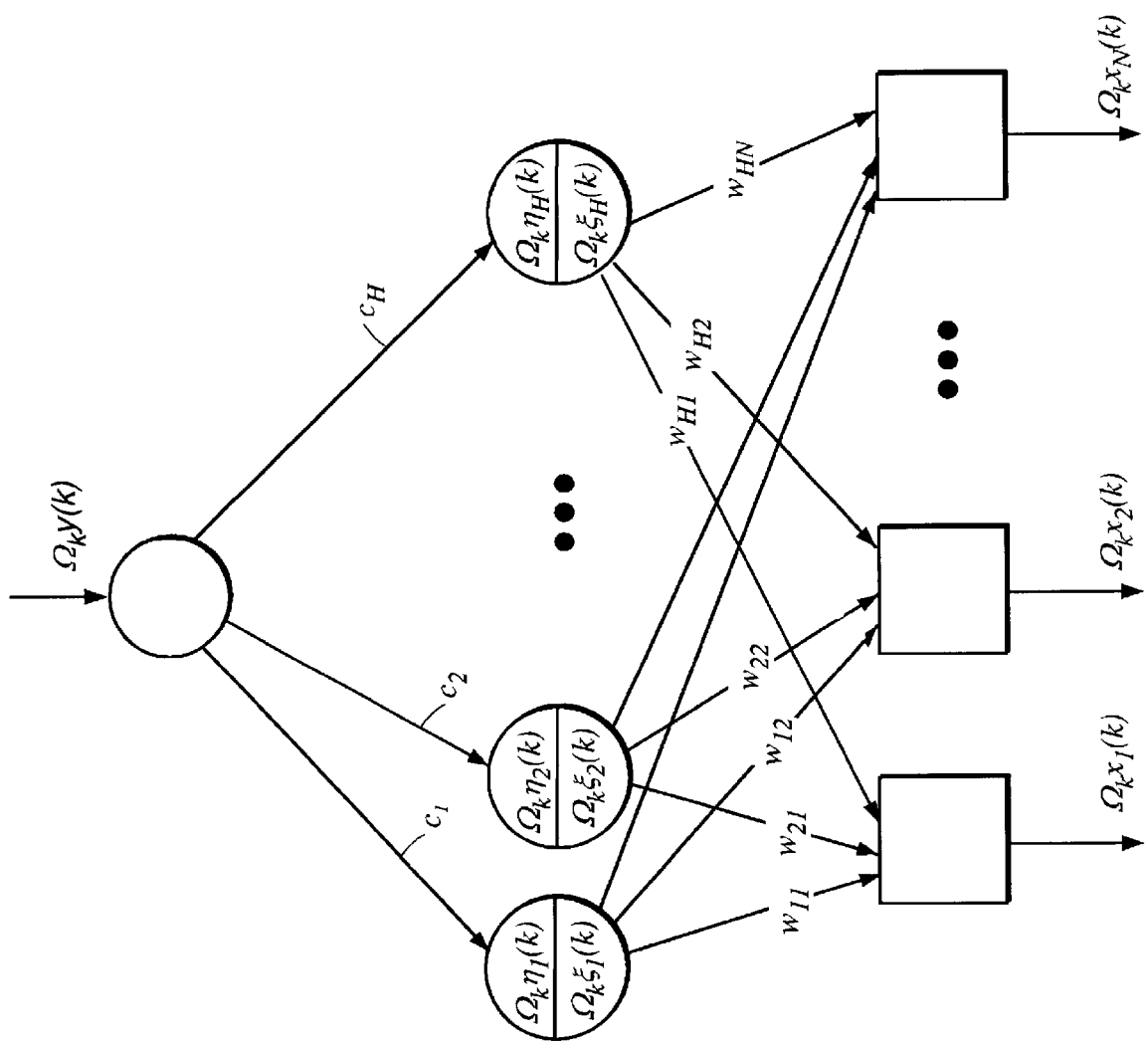
FIG. 10 shows the reverse flow configuration of the non-linear analyzer depicted in FIG. 9.

The reverse runtime operation of a neural net model is well known to those skilled in the art and is shown in FIG. 10. The output from the reverse operation of the postprocessing unit $\Omega_k y(k)$ is presented at the output node of the non-linear analyzer (26). The information flows in a reverse manner through the non-linear analyzer (26) and the resulting sensitivities (62) are output at the input nodes of the non-linear analyzer (26):

$$\Omega_k \eta_h(k) = c_h \Omega y(k) \tag{13}$$

$$\Omega_k \xi_h(k) = \Omega_k \eta_h(k) \tanh'(\xi_h(k))$$

$$= \Omega_k \eta_h(k)(1 - \eta_h(k))(1 + \eta_h(k))$$

$$\Omega_k x_i(k) = \sum_{h=1}^{H} w_{hi} \Omega_k \xi_h(k)$$

V.2.3 Reverse Runtime Operation of a Filter Unit

The effect of a change in the delayed input $u^d(l)$ on the sequence of states being output from a filter unit (24) in horizon mode is complex due to the dependencies of a subfilter's states based on the previous subfilter's states and on the subfilter's previous states. An efficient solution can be derived using the chain rule for ordered derivatives (Werbos, 1994) and is achieved by the reverse operation of the filter unit (24). In reverse horizon mode, the output of each filter unit (24) receives the vector of sensitivities $\Omega_s x_s(k)$ propagated back from the non-linear analyzer (26) operating in reverse mode:

$$\Omega_k x_s(l) = \begin{cases} \Omega_k x_s(k) & l = k \\ A_s^T(\Omega_k x_s(l+1)) + \Gamma_{s+1}^T(\Omega_k x_{s+1}(l+1)) & l < k, 1 \le s < S \\ A_S^T(\Omega_k x_S(l+1)) & l < k, s = S \\ 0 & l > k \end{cases} \tag{14}$$

$$\Omega_k u^d(l) = \sum_{s=1}^{S} b_s^T \Omega_k x_s(l)$$

The operation of these equations is shown in FIG. 1, which shows the filter structure of FIG. 4, but with data flowing in the reverse direction. Given the point k in the output path for which the sensitivities are being calculated, the vector of sensitivities $\Omega_k x_s(k)$ is presented at the output channels (1120, 1122 ... 1124) of the filter unit (24) and cycled in reverse through the filter structure. This reverse operation is indexed by $l \le k$. At each iteration l, the resulting sensitivity $\Omega_k u^d(l)$ is output at the input channel (1110) of the filter unit (24). For $l < k$ the external input at the output channels (1120, 1122 ... 1124) is in practice zero vector since $\Omega_k x_s(l) = 0$. However, the filter unit (24) itself is not constrained to operate under this assumption.

Figure 11:
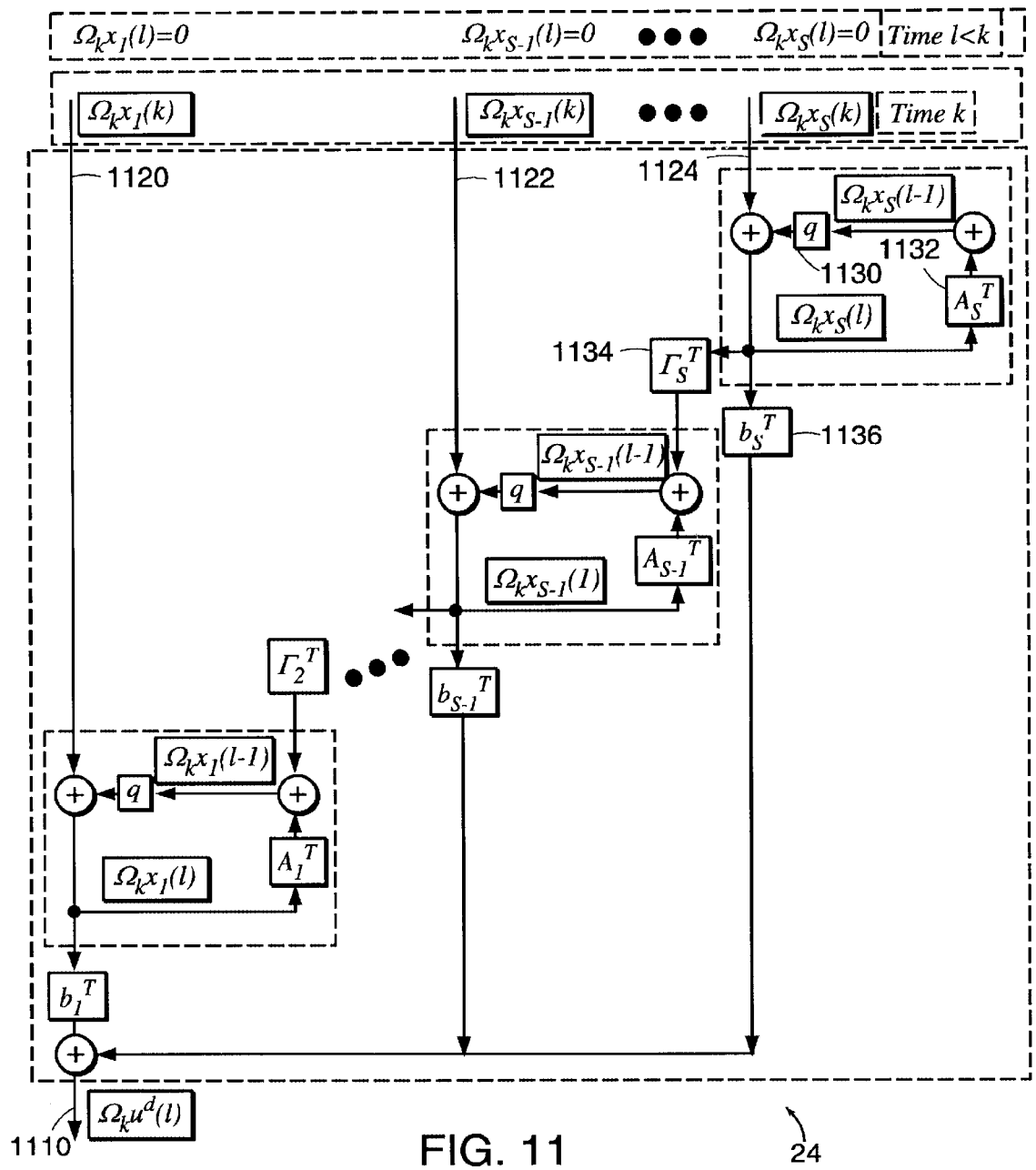
FIG. 11 shows the reverse flow internal decomposition of an individual filter unit into cascaded subfilter units.

In FIG. 11, the reverse operation of a delay (1130) is represented by q which is the unit delay in the reverse time direction since the index l is decreasing at each iteration.

Figure 14:
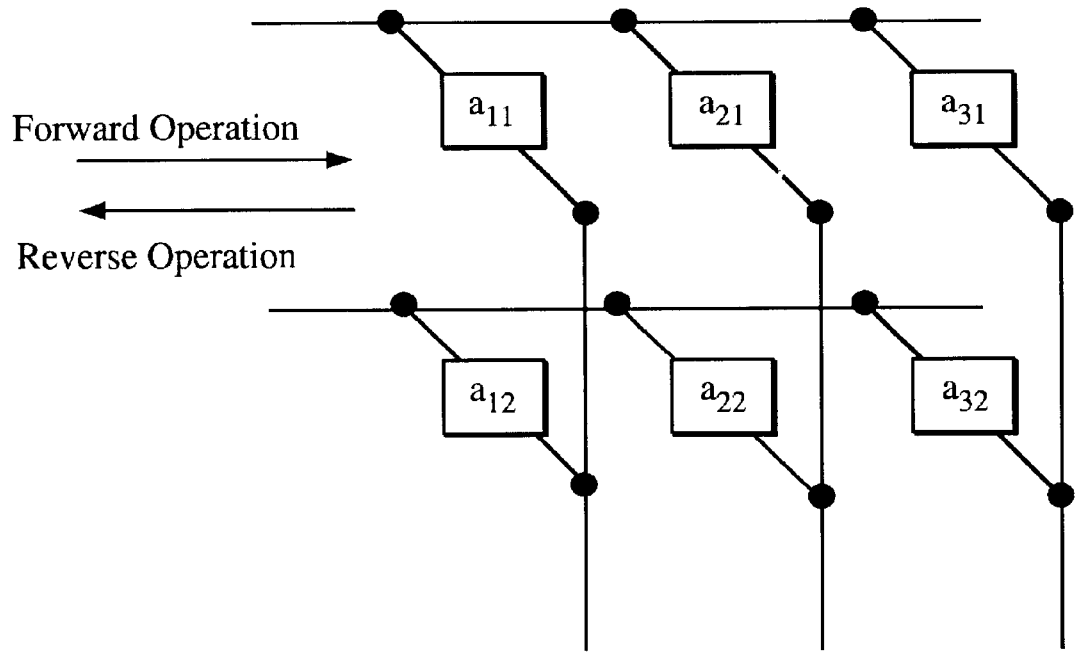
FIG. 14 shows that reverse flow of data through a matrix structure can be described mathematically by forward flow of data through the transpose matrix structure.
Figure 14:
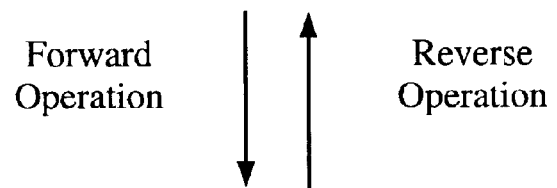

The reverse operation of a matrix operation (1132, 1134) or a vector operation (1136) is represented mathematically as the transpose of the forward operation. The physical justification for this is shown in FIG. 14 which shows the individual channels represented by a 3×2-matrix operation which in forward operation maps two input channels to three output channels, and in reverse operation maps three input channels to two output channels.

V.2.4 Reverse Runtime Operation of a Delay Unit

The reverse operation of a delay unit (22) corresponds to a delay in the reverse sequencing:

$$\Omega_k u(l) = \Omega_k u^d(l+d) \tag{15}$$

V.2.5 Reverse Runtime Operation of a Preprocessing Unit

The reverse operation of a preprocessing unit (20) is to scale data received at its output node using the inverse of the feedforward scaling shown in equation (1):

$$\Omega_k u_E(l) = \frac{1}{s} \Omega_k u(l) \tag{16}$$

V.3 Configuration Mode

The predictive device is configured, in the preferred embodiment, using training data collected from the process. However, a process engineer can override any automated configuration settings. The training data set should represent one or more data sets which have been collected at the same base-time sample rate that will be used by the external device controller to present data to the predictive device in prediction mode. Each set of data should represent a contiguous sequence of representative.

In order to allow operator approval or override of the configuration settings, the training of the predictive device is done in stages, each stage representing a major component of the predictive device.

V.3.1 Configuring the Preprocessing and Postprocessing Units

The scale and offset of a preprocessing or postprocessing unit is determined from the desire to map the minimum $E_{min}$ and maximum $E_{max}$ of the corresponding variable's engineering units to the minimum $N_{min}$ and maximum $N_{max}$ of the normalized units:

$$s = \frac{N_{max} - N_{min}}{E_{max} - E_{min}} \tag{17}$$

$$o = \frac{E_{max} N_{min} - E_{min} N_{max}}{E_{max} - E_{min}}$$

The preferred normalized units have $N_{min} = -1$, $N_{max} = 1$. The engineering units may be different for each input variable, leading to a different scale and offset for each preprocessing/postprocessing unit.

V.3.2 Configuring a Delay Unit

Figure 12:
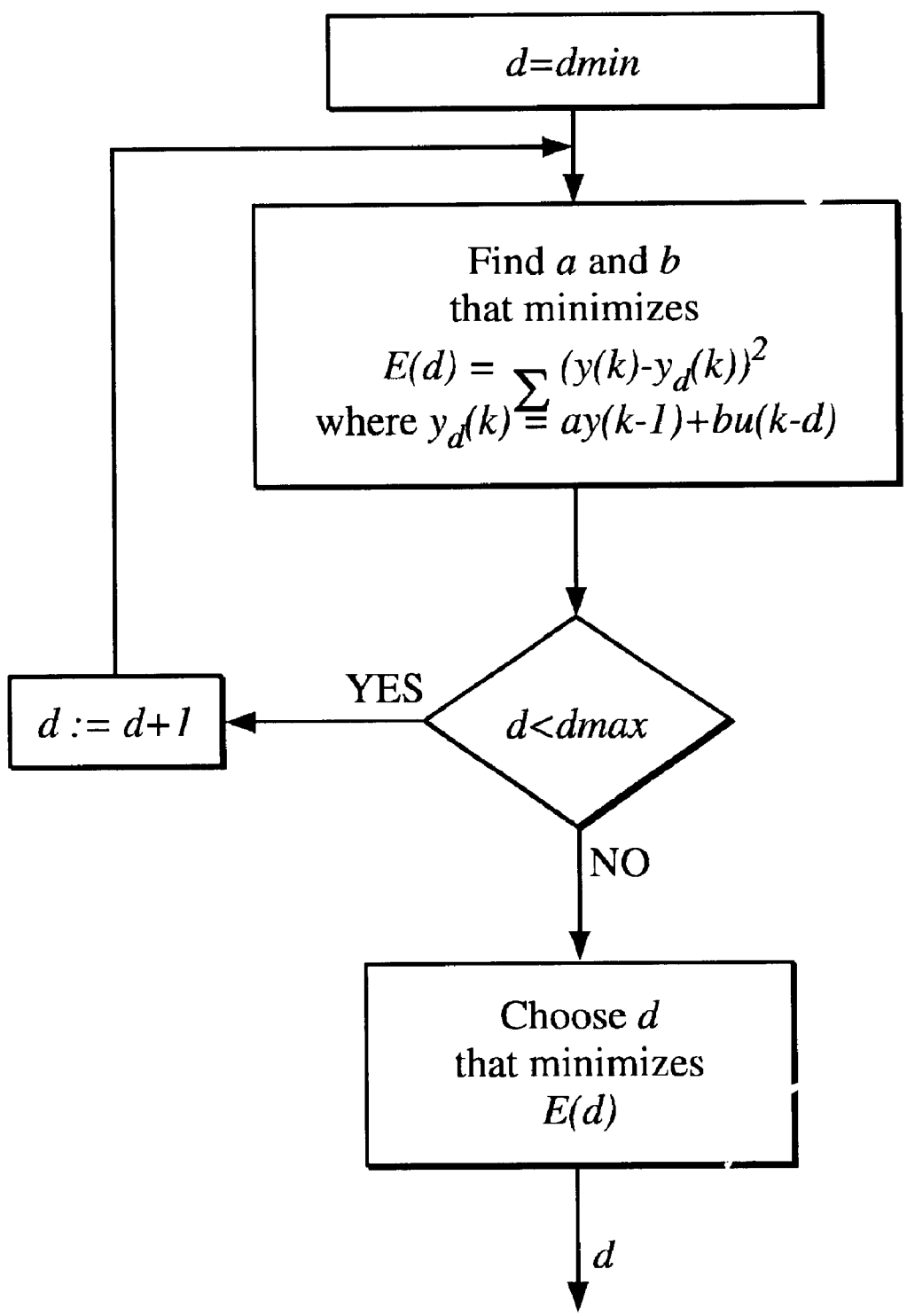
FIG. 12 shows a method of training an individual delay unit.

The configuration of a delay unit (22) is not a central aspect of this application. FIG. 12 shows a simple advisory procedure for suggesting delay times. A process engineer can override these advisory settings. In this procedure $d_{min}$ and $d_{max}$ are user settable limits for the delay time and the procedure calculates a delay time d such that $$d_{min} \le d \le d_{max}$$

V.3.3 Configuring A Filter Unit

A practical means of configuring a filter unit (24) is an essential aspect of this invention. The preferred method of configuration is initialized using the simplified filter structure shown in FIG. 13 in which all subfilters are first order and decoupled. This is the structure used in (Graettinger, et al, 1994). It is important to note that this structure is used for initialization of the configuration procedure and does not represent the final suggested filter configuration.

Step 1

The operator specifies an appropriate dominant time constant $T_i$ associated with each input variable. This can be specified from engineering knowledge or through an automated approach such as Frequency Analysis or a Back Propagation Through Time algorithm. The value of the initial time constant is not critical the proposed configuration method automatically searches the dominant time range for the best values.

Step 2

Figure 13:
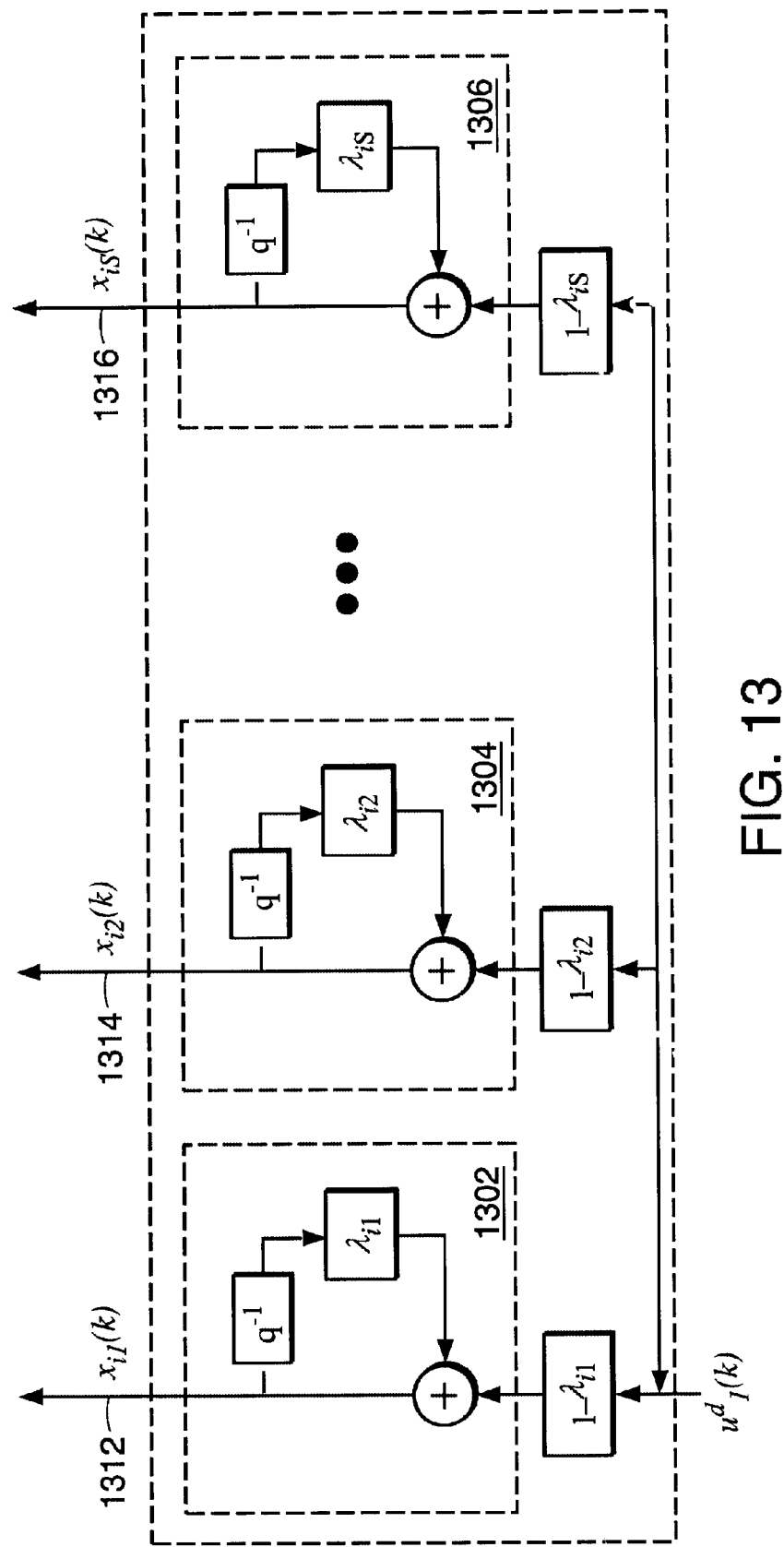
FIG. 13 shows the first order decoupled structure used at the start of each iteration of the preferred dynamic filter unit identification method.

For each input, initialize the filter structure in FIG. 13 using a high order system where a number of first order filters are created around the given dominant time constant (dominant frequency, dominant dynamics). For example, a fifth order system can be created using:

$$\lambda_{i1} = e^{-\frac{\Delta t}{0.5 T_i}} \tag{18}$$

$$\lambda_{i2} = e^{-\frac{\Delta t}{0.75 T_i}}$$

$$\lambda_{i3} = e^{-\frac{\Delta t}{T_i}}$$

$$\lambda_{i4} = e^{-\frac{\Delta t}{1.25 T_i}}$$

$$\lambda_{i5} = e^{-\frac{\Delta t}{1.5 T_i}}$$

In this simple filter structure, each subfilter (1302, 1304, 1306) yields a corresponding single state (1312, 1314, 1316) which is decoupled from the other subfilter states. This initial filter structure represents the equation $$x(k)=Ax(k-1)+Bu^d(k) \tag{19}$$

which has a simplified diagonal block structure of the form $$x(k) = \begin{bmatrix} x_1(k) \\ x_2(k) \\ \vdots \\ x_N(k) \end{bmatrix}$$

$$A = \begin{bmatrix} A_1 & 0 & 0 & 0 \\ 0 & A_2 & 0 & \vdots \\ 0 & 0 & \ddots & 0 \\ 0 & 0 & \cdots & A_N \end{bmatrix}$$

$$B = \begin{bmatrix} b_1 & 0 & 0 & 0 \\ 0 & b_2 & 0 & \vdots \\ 0 & 0 & \ddots & 0 \\ 0 & 0 & \cdots & b_N \end{bmatrix}$$

where $$x_i = \begin{bmatrix} x_{i1} \\ x_{i2} \\ \vdots \\ x_{i5} \end{bmatrix}$$

$$A_i = \begin{bmatrix} \lambda_{i1} & 0 & 0 & 0 \\ 0 & \lambda_{i2} & 0 & \vdots \\ 0 & 0 & \ddots & 0 \\ 0 & 0 & \cdots & \lambda_{i5} \end{bmatrix}$$

$$b_i = \begin{bmatrix} 1-\lambda_{i1} \\ 1-\lambda_{i2} \\ \vdots \\ 1-\lambda_{i5} \end{bmatrix}$$

Step 3

Map the contiguous input training data through the delay units (22) and filter structure (24) to obtain a set of training state vectors $\{X(k)|k=1, \ldots, T\}$. Then find a vector c that provides the best linear mapping of the states to the corresponding target outputs $\{Y(k)|k=1, \ldots, T\}$. One way of doing this is to use the Partial Least Squares method that is well known to those skilled in the art. This results in a multi-input, single-output (MISO) state space system $\{A,b,c^T\}$ in which equations (19), (20), and (21) are supplemented by the equation:

$$y(k)=c^T x \tag{22}$$

where $$c = \begin{bmatrix} c_1 \\ c_2 \\ \vdots \\ c_N \end{bmatrix}, c_i = \begin{bmatrix} c_{i1} \\ c_{i2} \\ \vdots \\ c_{i5} \end{bmatrix} \tag{23}$$

Step 4

Balance each subsystem $$\{A_i, b_i, c_i^T\}$$

of the MISO block diagonal system based on controllability & observability theory. The balancing procedure allows order reduction of a state space system by transforming the states so that the controllability and observability properties of the original system are substantially concentrated in the first part of the state vector.

For each input variable, indexed by i, perform the balancing procedure on the sub-system $$\{A_i, b_i, c_i^T\}.$$

Balancing of a linear state space system is a method of reduction well known to those skilled in the art. Other methods of model reduction, such as Hankel reduction, can be substituted. A summary of the balancing method is now given.

For each sub-system $$\{A_i, b_i, c_i^T\},$$

compute the controllability and observability Gramians $P_i>0$, $Q_i>0$ that satisfy the equations:

$$A_i P_i A_i^T - P_i = -b_i b_i^T \tag{24}$$

$$A_i^T Q_i A_i - Q_i = -c_i c_i^T$$

Find a matrix $R_i$, using the Cholesky factorization method, such that $$P_i = R_i^T R_i. \tag{25}$$

Using the singular value decomposition method, diagonalize to obtain the following decomposition:

$$R_i Q_i R_i^T = U_i \Sigma_i^2 U_i^T \tag{26}$$

Define $$T_i^{-1} = R_i^T U_i \Sigma_i^{-1/2} \tag{27}$$

then $$T_i P_i T_i^T = (T_i^T)^{-1} Q_i T_i^{-1} = \Sigma_i \tag{28}$$

and the balanced subsystem is obtained through a similarity transform on the states as:

$$\hat{A}_i = T_i A_i T_i^{-1}, \hat{b}_i = T_i b_i, \hat{c}_i^T = c_i^T T_i^{-1} \quad (29)$$

Step 5

Using balanced subsystems find out dominant time constant for each input by reducing each balanced model to a first order model. This is done by considering the dynamics of all but the first state of each input's filter unit (24) to have reached steady state. This leads to:

$$T_i = -\frac{\Delta t}{\ln(a_i)} \quad (30)$$

where $$a_i = \hat{a}_{i11} + \hat{a}_{i12}^T (I - \hat{A}_{i22})^{-1} \hat{a}_{i21} \quad (31)$$

and $$\hat{A}_i \equiv \begin{bmatrix} \hat{a}_{i11} & \hat{a}_{i12}^T \\ \hat{a}_{i21} & \hat{A}_{i22} \end{bmatrix} \quad (32)$$

Check the convergence of the dominant time constant estimation:

If $$\frac{1}{N} \sqrt{\sum_{i=1}^{N} (a_i^{current} - a_i^{previous})^2} < \varepsilon \quad (33)$$

or the number of iterations has exceeded the maximum allowable, go to step 6. Otherwise, return to step 2. The maximum number of iterations and ε are parameters of the training method.

Step 6

Once an accurate estimate of the dominant time constant is available for each input variable, the eigenvalues $$\{\lambda_{is}^P \mid s = 1, \cdots, 5\}$$

of the controllability gramian $\hat{P}_i$ (equivalently the observability gramian) are calculated; these are always positive and real because the controllability gramian is positive definite. The final order $S_i$ of each filter unit (24) is then calculated such that $$\frac{\sum_{s=1}^{S_i-1} \lambda_{is}^P}{\sum_{s=1}^{5} \lambda_{is}^P} < \theta \leq \frac{\sum_{s=1}^{S_i} \lambda_{is}^P}{\sum_{s=1}^{5} \lambda_{is}^P} \quad (34)$$

where θ is parameter of the training method and is a value less than 1, a good practical value being 0.95. This order represents the total number of states of an individual filter unit (24).

After determining the model order, truncate the $\hat{A}_i$ matrix so that just the first $S_i$ states are used; this truncation is done by selecting the upper left $S_i \times S_i$ submatrix of $\hat{A}_i$. Then calculate the $S_i$ eigenvalues of the truncated $\hat{A}_i$ matrix $\{\lambda_{is}|s=1, \ldots, S_i\}$. Now configure each filter unit (24) using the preferred first and second order subfilter configurations with the preferred couplings as shown in FIG. 5 through FIG. 8. Use a first order filter for each real eigenvalue. Use a second order filter for each pair of complex eigenvalues $\{\lambda, \overline{\lambda}\}$, where, in FIG. 7 (equation 7) or FIG. 8 (equation 8):

$$a_{11} = \lambda + \overline{\lambda}$$

$$a_{12} = -\lambda\overline{\lambda} \quad (35)$$

The preferred ordering of these subfilter units is according to time-constant, with the fastest unit being the primary subfilter.

Another favored approach is to perform model reduction by initializing with Laguerre type filter units as described in section V.4.2, rather than the simple diagonal filter structure of FIG. 13. Sufficient quantity of Laguerre type filter units span the full range of dynamics in the process, and thus the iterative process described above is not needed. In fact a non-linear model reduction can be achieved by performing a linear model reduction on the linear system whose states are defined by the Laguerre filters and whose outputs are defined by pre-transformed values at the hidden layer of the neural net:

$$\xi_1(k), \ldots, \xi_H(k)$$

V.3.4 Configuring the Non-Linear Analyzer

The configuration of the non-linear analyzer (26) is not a central aspect of this application. The non-linear analyzer (26) is trained to optimally map the outputs of the filter units (24) to the corresponding target output. Training of a neural net is described in detail in (Bishop, 95) for example.

V.4 Universality of the Prediction Device

The predictive device is shown, in this section, to be able to approximate any time invariant, causal, fading memory system (defined below). In order to prove this, some precise notation and definitions will be needed.

V.4.1 Notation and Definitions for Universality Proof

Let Z denote the integers, $Z_+$ the non-negative integers and $Z_-$ the non-positive integers respectively. A variable u represents a vector or a sequence in accordance with the context, while u(k) represents a value of the sequence at the particular time k.

For any positive integer p>0, $R^N$ denotes the normed linear space of real N-vectors (viewed as column vectors) with norm $|u|=\max_{1 \leq i \leq N}|u_n|$. Matrices are denoted in uppercase bold. Functions are denoted in italic lowercase if they are scalars and in bold if they are vector valued.

Let $$l_N^\infty(Z) \text{ (respectively } l_N^\infty(Z_+) \text{ and } l_N^\infty(Z_-)\text{)},$$

be the space of bounded $R^N$-valued sequences defined on Z (respectively $Z_+$ and $Z_-$) with the norm:

$$\|u\|_\infty = \sup_{k \in Z} |u(k)|$$

For every decreasing sequence w: $Z_+ \rightarrow (0,1]$, $$\lim_{k \to \infty} w(k) = 0$$

define the following weighted norm:

$$\|u\|_w = \sup_{k \in Z_-} |u(k)| w(-k)$$

A function $$F: l_N^\infty(Z_-) \to R$$

is called a functional on $$l_N^\infty(Z_-),$$

and a function $$\Im: l_N^\infty(Z_-) \to l^\infty(Z)$$

is called an operator. As a notational simplification the parentheses around the arguments of functionals and operators are usually dropped; for example, Fu rather than F[u] and $\Im u(k)$ rather than $\Im[u](k)$.

Two specific operators are important. The delay operator defined by $$Q^d u(k) \equiv u(k-d)$$

and the truncation operator defined by $$Pu(k) \equiv \begin{cases} u(k) & k \le 0 \\ 0 & k > 0 \end{cases}$$

The following definitions make precise the terms used to characterize the class of systems approximated by the predictive device.

Time invariant: An operator $\Im$ is time-invariant if $Q^d \Im = \Im Q^d \forall d \in Z$.

Causality: $\Im$ is causal if $u(l)=v(l) \forall l \le k \Rightarrow \Im u(k) = \Im v(k)$.

Fading Memory:

$$\Im: l_N^\infty(Z) \to l^\infty(Z)$$

has fading memory on a subset $K_- \subset l_N^\infty(Z_-)$ if there is a decreasing sequence w:

$$Z_+ \to (0, 1], \lim_{k \to \infty} w(k) = 0,$$

such that for each u, v∈K_ and given ε>0 there is a δ>0 such that $$\|u(k)-v(k)\|_w < \epsilon \Rightarrow |\Im u(0) - \Im v(0)| < \delta$$

Every sequence $$u \text{ in } l_N^\infty(Z_-)$$

can be associated with a causal extension sequence $$u_c \text{ in } l_N^\infty(Z)$$

defined as:

$$u_c(k) \equiv \begin{cases} u(k) & k \le 0 \\ u(0) & k > 0 \end{cases}$$

and each time invariant causal operator $\Im$ can be associated with a functional F on $$l_N^\infty(Z_-)$$

defined by $$Fu = \Im u_c(0)$$

The, operator $\Im$ can be recovered from its associated functional F via $$\Im u(k) = FPQ^{-k}u \quad (36)$$

Then, $\Im$ is continuous if and only if F is, so the above equations establish a one to one correspondence between time invariant causal continuous operators and functionals F on $$l_N^\infty(Z_-).$$

In the next the definition of the Laguerre system is given. These can be configured in the general filter structure of FIG. 4 but also have important theoretical properties.

V.4.2 Laguerre Systems

The set of the Laguerre systems is defined in the complex z-transform plane as:

$$L_s^i = \frac{\sqrt{\eta_i}\, z^{-d_i+1}}{z-a_j}\left[\frac{1-a_j z}{z-a_j}\right]^s, s = 0, 1, \cdots, \infty, i = 1, \cdots, N$$

where:

$L_s^i(z)$: is the z transform of $l_s^i(k)$, the s-th order system for the i-th input.

$a_i$: is the i-th input generating pole, such that $|a_i|<1$. This pole is selected as $$a_i = 1 - \frac{\Delta T}{T_i},$$

where $T_i$ is the dominant time constant for the i-th input variable.

$d_i$: is the time delay associated with the i-th input variable.

$\eta_i := 1-a_i^2$

The whole set of Laguerre systems can be expressed in a state space form that shows a decoupled input form and therefore can be mapped to the general filter structure in FIG. 4. Each filter unit (24) is configured as a single structured $\{A_i, B_i\}$ subfilter. The structure of $A_i$ is a lower triangular matrix, and $b_i=[1\ 0\ \ldots\ 0]^T$.

The key point here is that the representation is decoupled by input. Balancing can be done to decrease the order of the Laguerre systems, and similarity transforms can be done on the Laguerre filters in order to simplify the configuration to utilize the preferred subfilter units. Similarity transformations do not affect the accuracy of the representation and so proving that the use of Laguerre filters decoupled by input approximate any time invariant, causal, fading memory system is equivalent to proving the preferred subfilter structure can approximate any such system. The balancing is a practical mechanism to reduce order without degrading performance.

V.4.3 Proof of Approximation Ability of Laguerre Systems

First some preliminary results are stated:

Stone-Weierstrass Theorem (Boyd,1985).

Suppose E is a compact metric space and G a set of continuous functionals on E that separates points, that is for any distinct u, v∈E there is a G∈G such that $Gu \neq Gv$. Then for any continuous functional F on E and given $\epsilon > 0$, there are functionals, $$\{G_1^1, \cdots G_{S_1}^1, \cdots, G_1^N, \cdots G_{S_N}^N\} \subseteq G, S = \sum_{i=1}^N S_i$$

and a polynomial p: $R^S \to R$, such that for all u∈E $$|Fu - p(G_1^1 u, \cdots, G_{S_1}^1 u, \cdots, G_1^N u, \cdots, G_{S_N}^N u)| < \varepsilon$$

The reason for the group indexing, which is not necessary for a general statement of the Stone-Weierstrass theorem, will become apparent in Lemma 2 when each block with a Laguerre operator. In addition, three lemmas are necessary before the theorem can be proved.

Lemma 1:

$$K_- \equiv \{u \in l_N^\infty(Z_-) \mid 0 < \|u\| \le c_1\},$$

is compact with the $\|\cdot\|_w$ norm.

Proof: Let $u^{(p)}$ be any sequence in $K_-$. We will find a $u^{(0)} \in K_-$ and a subsequence of $u^{(p)}$ converging in the $\|\forall\|_w$ norm to $u^{(0)}$. It is well know that $K_-$ is not compact in $$l_N^\infty(Z_-)$$

with the usual supremum norm $\|\forall\|_\infty$ (Kolmogorov, 1980). For each l, let be $K_-[-l,0]$ the restriction of $K_-$ to $[-l,0]$. $K_-[-l,0]$ is uniformly bounded by $c_1$ and is composed of a finite set of values, hence compact in $$l_N^\infty[-l, 0].$$

Since $K_-[-l,0]$ is compact for every l, we can find a subsequence $u^{(pm)}$ of $u^{(p)}$ and a $u^{(0)} \in K_-[-l,0]$ along which $u^{(pm)}$ converges:

$$\sup_{-l \le k \le 0} |u^{(pm)}(k) - u^{(0)}(k)| \to 0 \text{ as } m \to \infty \quad (37)$$

Now, let $\epsilon > 0$. Since $w(k) \to 0$ as $k \to \infty$, we can find $m_0 > 0$ a such that $w(m_0) \le \epsilon/c_1$. Since $u^{(pm)}, u^{(0)} \in K_-$, we have that $$\sup_{k \le -m_0} |u^{(pm)}(k) - u^{(0)}(k)| w(-k) \le 2c_1 w(m_0) < \varepsilon \quad (38)$$

Now from equation (37) we can find $m_1$ such that $$\sup_{-m_u < k \le 0} |u^{(pm)}(k) - u^{(0)}(k)| < \varepsilon \text{ for } m > m_1 \quad (39)$$

so by equation (38) and equation (39) we can conclude that $$\|u^{(pm)} - u^{(0)}\|_w < \epsilon \text{ for } m > m_1$$

which proves that $K_-$ is compact.

Lemma 2. The set of functional $$\{G_s^i\}$$

associated to the discrete Laguerre Operators are continuous with respect to $\|\cdot\|_w$ norm, that is, given any $\epsilon > 0$ there exists $\delta > 0$ such that $$\|u - v\|_w < \delta \Rightarrow |G_s^i u - G_s^i v| < \varepsilon$$

Proof. Consider the functional $$G_s^i(\cdot)$$

associated with the Laguerre operator $$L_s^i(\cdot).$$

Given $\epsilon > 0$, chose $\delta > 0$ such that:

$$|u_i - v_i|_w < \delta \Rightarrow |G_s^i u_i - G_s^i v_i| < \varepsilon \quad (40)$$

This is possible due to the continuity of the one dimensional Laguerre operators with respect to the weighted norm as shown in (Sentoni et al, 1996). Therefore, from equation (40) and the definition of the functionals $$\|u - v\|_w < \delta \Rightarrow |u_i - v_i|_w < \delta \Rightarrow |G_s^i u - G_s^i v| = |G_s^i u_i - G_s^i v_i| < \varepsilon \quad (41)$$

which proves Lemma 2.

Lemma 3. The $$\{G_s^i\}$$

separate points in $$l_N^\infty(Z_-),$$

that is, for any distinct $$u, v \in l_N^\infty(Z_-)$$

there is a $$G_s^i \in G$$

such that $$G_s^i u \neq G_s^i v.$$

Proof. Suppose $$u, v \in l_N^\infty(Z_-)$$

are equal except for the i-th component. Then $$G_s^i u \neq G_s^i v \Leftrightarrow G_s^i u_i \neq G_s^i v_i \quad (42)$$

by the definition of the functionals. It is known from one dimensional theory (Sentoni et al, 1996) that for any distinct $u_i$, $v_i \in l^\infty(Z_-)$ there is a $G_s^i$ such that $$G_s^i u_i \neq G_s^i v_i;$$

this result together with equation (42) proves Lemma 3.

Approximation Theorem

Now given $\epsilon > 0$, Lemmas 1, 2, 3 together with the Stone-Weierstrass theorem imply that given any continuous functional F on $K_-$, there is a polynomial p: $R^S \to R$, such that for all $u \in K_-$ $$|Fu - p(G_1^1 u, \cdots, G_{S_1}^1 u, \cdots, G_1^N u, \cdots, G_{S_N}^N u)| < \varepsilon \quad (43)$$

Because the Laguerre systems are continuous and acting on a bounded space, the $G_s^1 u$ are bounded real intervals on so the polynomial p can be replaced by any static model that acts as a universal approximator on a bounded input space, for example, a neural net. In other words (43) can be replaced by $$|Fu - NN(G_1^1 u, \cdots, G_{S_1}^1 u, \cdots, G_1^N u, \cdots, G_{S_N}^N u)| < \varepsilon \quad (44)$$

A time invariant causal operator $\Im$ can be recovered from its associated functional through equation (36) as $$\Im u(k) = FPQ^{-k} u$$

Now let $u \in K$ and $k \in Z$, so $PQ^{-k} u \in K_-$, hence $$|FPQ^{-k} u - NN$$
$$(G_1^1 PQ^{-k} u, \cdots, G_{S_1}^1 PQ^{-k} u, \cdots, G_1^N PQ^{-k} u, \cdots, G_{S_N}^N PQ^{-k} u)| < \varepsilon$$

Since the last equation is true for all $k \in Z$, we conclude that for all $u \in K_-$ $$\|\Im u - \hat{\Im} u\| < \epsilon$$

In other words, it is possible to approximate any nonlinear discrete time invariant operator having fading memory on K, with a finite set of discrete Laguerre systems followed by a single hidden layer neural net. This completes the proof.

V.5 Equivalents

Although the foregoing details refer to particular preferred embodiments of the invention, it should be understood that the invention is not limited to these details. Substitutions and alterations, which will occur to those of ordinary skill in the art, can be made to the detailed embodiments without departing from the spirit of the invention. These modifications are intended to be within the scope of the present invention.

What is claimed is:

1. A predictive device for modeling a non-linear, causal, multiple-input single-output system or process, comprising:
a plurality of preprocessing units for receiving a working signal including control data inputs, the preprocessing units normalizing the control data inputs, resulting in preprocessed inputs;
a plurality of delay units coupled to the preprocessing units, the delay units time aligning the preprocessed inputs, resulting in time aligned inputs;
a plurality of filter units coupled to the delay units, the filter units being of a substantially simplified configuration as compared to a configuration based upon discrete state space equations, the filter units filtering the time aligned inputs at least according to time, resulting in filtered states;
a non-linear analyzer coupled to the filter units and accepting the filtered states, the non-linear analyzer generating a single analyzer output;
a postprocessing unit coupled to the non-linear analyzer to receive the generated analyzer output, the postprocessing unit converting the single analyzer output to a single device output that represents a prediction of the output of the multiple-input single-output dynamic system being modeled by the device, and
wherein the predictive device operates in a plurality of selectable modes including a configuration mode and multiple runtime modes that provide a generalized modeling of non-linear dynamic processes.

2. The device of claim 1 further comprising:
a device controller coupled to the preprocessing units for providing input thereto; and
the single device output and other data generated by the predictive device, in any of the selectable modes, are received by the device controller for analysis, monitoring, optimization or control of the modeled process and/or the predictive device.

3. The device of claim 1 wherein the preprocessing units normalize the control data inputs by scaling and offsetting the control data inputs, resulting in preprocessed inputs.

4. The device of claim 1 wherein the postprocessing unit normalizes the analyzer output by scaling and offsetting the analyzer output, resulting in a postprocessed device output as the single device output.

5. The device of claim 1 further comprising a plurality of training units for configuring the predictive device in configuration mode, the training units including:
a preprocessing training unit to set overrideable parameters, including scale and offset settings, in the plurality of preprocessing units;
a delay training unit to set overrideable delay times to the plurality of delay units;
a filter training unit to configure the plurality of filter units;
a non-linear analyzer training unit to train the non-linear analyzer to optimally map the filtered states to the analyzer output;

a postprocessing training unit to set overrideable parameters, including scale and offset settings, in the plurality of postprocessing units; and wherein the training units are activated when the predictive device is operated in configuration mode.

6. The device of claim 5 wherein the filter training unit is used to configure, in a practical manner allowing relatively simple override by an operator, the plurality of filter units by using input training data for control data input, and by using a corresponding measured process output for target device output training data, and by:

(a) setting an initial estimated dominant time constant associated with each input training data;

(b) for each input training data, initializing a filter structure based on the input training data's initial estimated dominant time constant;

(c) for each target device output training data, determining a corresponding target analyzer output training data, (d) mapping input training data through the delay units and the filter structure, resulting in a plurality of training filter state vectors, creating a vector trained to linearly map training states to the corresponding target analyzer outputs, resulting in a multi-input, single-output state space system including a block structure of single-input single-output sub-systems, one for each filter unit;

(e) applying a method of order reduction to each single-input, single-output sub-system, resulting in a set of reduced order single-input, single-output sub-systems;

(f) reducing each reduced single-input, single-output sub-system to a first order system, to determine an updated estimated dominant time constant for each input training data;

(g) repeating steps (a) through (f) for one or more iterations using the updated estimated dominant time constants in place of the initial estimated dominant time constants; and (h) configuring each filter unit using the corresponding reduced order single-input, single-output sub-system.

7. The device of claim 6 wherein the method of reduction is a Hankel model reduction procedure.

8. The device of claim 6 wherein the method of reduction is an Internally Balanced model reduction procedure.

9. The device of claim 6 wherein the method of reduction is an iterative application of any of a variety of model reduction procedures including a Hankel model reduction procedure and an Internally Balanced model reduction procedure.

10. The device of claim 5 wherein the filter training unit is used to configure, in a practical manner allowing relatively simple override by an operator, the plurality of filter units by using input training data for control data input, and by using a corresponding measured process output for target device output training data, and by:

(a) setting an estimated dominant time constant associated with each input training data;

(b) for each input training data, initializing a filter structure based upon the input training data's estimated dominant time constant;

(c) for each target device output training data, determining a corresponding target analyzer output training data;

(d) mapping input training data through the delay units and the filter structure, resulting in a plurality of training filter state vectors, creating an analyzer trained to map training states to the corresponding target analyzer outputs, where said analyzer has a set of internal states which are linearly dependent on a current filter state vector, resulting in a linear multi-input, multi-output state space system mapping input training data to said analyzer internal states, where said linear multi-input, multi-output state space system includes a block structure of single-input multi-output sub-systems, one for each filter unit;

(e) applying a method of order reduction to each single-input, multi-output sub-system, resulting in a set of reduced order single-input, multi-output sub-systems; and (f) configuring each filter unit using the corresponding reduced order single-input, multi-output sub-systems.

11. The device of claim 10 wherein the analyzer is non-linear and is a neural network with a hidden layer, and the internal states are summation values of the neural network hidden layer.

12. The device of claim 10 wherein the analyzer is a Partial Least Squares model and the internal states are latent variable scores.

13. The device of claim 10 wherein the method of reduction is a Hankel model reduction procedure.

14. The device of claim 10 wherein the method of reduction is an Internally Balanced model reduction procedure.

15. The device of claim 10 wherein the method of reduction is an iterative application of any of a variety of model reduction procedures including a Hankel model reduction procedure and an Internally Balanced model reduction procedure.

16. The device of claim 6 or claim 10 wherein the initializing of the filter structure uses a Laguerre expansion.

17. The device of claim 1 wherein the plurality of selectable runtime modes includes a predictive mode in which:

(i) the predictive device receives a contiguous stream of control data inputs at asynchronous discrete base sample time; and (ii) the predictive device is operated once per base sample time.

18. The device of claim 17 wherein the contiguous stream of control data inputs is passed from a device controller and the analyzer output is received by the device controller for analysis, monitoring, optimization or control of the modeled process.

19. The device of claim 1 wherein the plurality of selectable runtime modes comprises an horizon mode in which the predictive device:

receives an externally defined sequence of trial future data inputs proceeding from a current prediction mode device state;

is operated in response to this sequence of trial data inputs producing a corresponding sequence of at least filtered states, and possible other state information; and stores the filtered states and other state information for use in reverse horizon mode.

20. The device of claim 19 wherein the horizon mode is run one or more times between runs of the predictive device in the predictive mode.

21. The device of claim 19 wherein a contiguous stream of external trial data inputs is passed to the predictive device from a device controller; and the predictions generated during horizon mode are received by the device controller for analysis, monitoring, optimization or control of the modeled process.

22. The device of claim 19 wherein the plurality of selectable runtime modes comprises a reverse horizon mode in which the predictive device uses
  (i) the filtered states and other state information from a most recent horizon mode run, and
  (ii) an output path index indicating a point in a generated sequence of predictions to obtain the sensitivities of the predictive device to changes in the trial input data sequence used by the most recent horizon mode run, based upon running the predictive device backwards.

23. The device of claim 22 wherein the reverse horizon mode is run one or more times between runs of the predictive device in the predictive mode.

24. The device of claim 22 wherein
  the predictive device sensitivities generated during reverse horizon mode are received by a device controller for analysis, monitoring, optimization or control of the modeled process.

25. The device of claim 22 wherein
  a device controller specifies the output path index.

26. The device of claim 1 wherein the plurality of filter units comprise:
  first and/or second order subfilters.

27. The device of claim 1 wherein the non-linear analyzer comprises:
  a neural network.

28. The device of claim 1 wherein the non-linear analyzer comprises:
  a Partial Least Squares model.

29. The device of claim 1 wherein the non-linear analyzer comprises:
  a hybrid parallel combination of a linear model with a non-linear model.

30. A computer method for modeling a non-linear, causal, multiple-input single-output, system or process, comprising the steps of:
  (a) receiving and normalizing a working signal including control data inputs, resulting in preprocessed inputs;
  (b) aligning the preprocessed inputs, resulting in time aligned inputs;
  (c) using a plurality of filter units having a substantially simplified configuration as compared to a configuration based on discrete state space equations, filtering the time aligned inputs, at least according to time, resulting in filtered states;
  (d) generating an analyzer output based upon the filtered states, said generating employing a non-linear analyzer; and
  (e) converting the analyzer output to a model output that represents a prediction of the output of the multiple-input single-output dynamic system being modeled by the method, in a manner that provides a general modeling of non-linear dynamic processes.

31. The method of claim 30 wherein the step of receiving includes receiving a contiguous stream of control data inputs from an external system, said data inputs representing measurements from the modeled process; and
  further comprising the step of passing model output to an external system for analysis, monitoring, optimization or control of the modeled process.

32. The method of claim 30 wherein the normalizing step employs a scale and offset for each input.

33. The method of claim 30 wherein the converting step employs a scale and offset.

34. The method of claim 30 further comprising the step of configuring including the steps of:
  (a) setting overrideable parameters, including scale and offset settings, for the receiving and normalizing step;
  (b) setting overrideable delay times, for the aligning the preprocessed inputs step;
  (c) training the plurality of filter units used in the filtering of the time aligned inputs step;
  (d) training the non-linear analyzer to optimally map the filtered states to the analyzer output in the generating analyzer outputs step; and
  (e) setting overrideable parameters, including scale and offset settings, for the converting the analyzer output to a model output.

35. The method of claim 34 wherein the step of training the filter units includes:
  employing a filter training unit to configure, in a practical manner allowing relatively simple override by an operator, the plurality of filter units by using input training data for control data input, and by using a corresponding measured process output for target model output training data, and by:
  (a) setting an initial estimated dominant time constant associated with each input training data;
  (b) for each input training data, initializing a filter structure based on the input training data's initial estimated dominant time constant;
  (c) for each target device output training data, determining a corresponding target analyzer output training data;
  (d) mapping input training data through a set of delay units and the filter structure, resulting in a plurality of training filter state vectors, creating a vector trained to linearly map training states to the corresponding target analyzer outputs, resulting in a multi-input, single-output state space system having a block structure of single-input single-output subsystems, one for each filter unit;
  (e) applying a method of order reduction to each single-input, single-output sub-system, resulting in a set of reduced order single-input, single-output subsystems;
  (f) reducing each reduced single-input, single-output sub-system to a first order system to determine an updated estimated dominant time constant for each input training data;
  (g) repeating steps (a) through (f) for one or more iterations using the updated estimated dominant time constants in place of the initial estimated dominant time constants; and
  (h) configuring each filter unit using the corresponding reduced order single-input, single-output sub-system.

36. The method of claim 34 wherein the step of training the filter units includes:
  employing a filter training unit to configure, in a practical manner allowing relatively simple override by an operator, the plurality of filter units by using input training data for control data input, and by using a corresponding measured process output for target model output training data, and by:
  (a) setting an estimated dominant time constant associated with each input training data;
  (b) for each input training data, initializing a filter structure based upon the input training data's estimated dominant time constant;
  (c) for each target device output training data, determining a corresponding target analyzer output training data;

(d) mapping input training data through a set of delay units and the filter structure, resulting in a plurality of training filter state vectors, creating a linear or non-linear analyzer trained to map training states to the corresponding target analyzer outputs, where said analyzer has a set of internal states which are linearly dependent on a current filter state vector, resulting in a linear multi-input, multi-output state space system mapping input training data to said analyzer internal states, the delay units being coupled to the filter units and said linear multi-input, multi-output state space system having a block structure of single-input multi-output sub-systems, one for each filter unit;

(e) applying a method of order reduction to each single-input, multi-output sub-system, resulting in a set of reduced order single-input, multi-output sub-systems; and (f) configuring each filter unit using the corresponding reduced order single-input, multi-output sub-systems.

37. The method of claim 35 or claim 36 wherein the step of balancing employs a Hankel model reduction procedure.

38. The method of claim 35 or claim 36 wherein the step of balancing employs an Internally Balanced model reduction procedure.

39. The method of claim 35 or claim 36 wherein the step of balancing employs an iterative application of any of a variety of model reduction procedures including a Hankel model reduction procedure and an Internally Balanced model reduction procedure.

40. The method of claim 35 or claim 36 herein the step of initializing the filter structure uses a Laguerre expansion.

41. The method of claim 36 wherein the non-linear analyzer step employs a neural network and the internal states are the summation values of the neural network hidden layer.

42. The method of claim 36 wherein the linear or non-linear analyzer employs a Partial Least Squares model and the internal states are latent variable scores.

43. The method of claim 30 wherein, in a predictive mode, the step of receiving includes receiving a contiguous stream of control data inputs from an external system, said data inputs representing measurements from the modeled process;

said receiving of data inputs occurs once per base sample; and the steps (a) through (e) are performed once per base sample.

44. The method of claim 43 further comprising the step of passing the model output to the external system for analysis, monitoring, optimization or control of the molded process.

45. The method of claim 30 wherein, in an horizon mode, steps (a) through (e) are iterated multiple times wherein, at each iteration, the filtered states and othe state information are stored for later use.

46. The method of claim 45 further comprising the step of passing the model output at each iteration to an external device or method for analysis, monitoring, optimization or control of the modeled process.

47. The method of claim 45 wherein, in a reverse horizon mode, steps (a) through (e) are iterated multiple times in reverse order, wherein, at each iteration the steps employ stored information; and calculating sensitivities of the model output for a specified iteration with respect to changes in the predictive mode received data input at each previous iteration, where said specified iteration is provided by an external system.

48. The method of claim 47 further comprising the step of passing the calculated sensitivities at each iteration to the external device or method for analysis, monitoring, optimization or control of the modeled process.

49. The method of claim 30 wherein the plurality of filter units comprise:

first and/or second order subfilters.

50. The method of claim 30 wherein the non-linear analyzer comprises:

a neural network.

51. The method of claim 30 wherein the non-linear analyzer comprises:

a linear or non-linear Partial Least Squares model.

52. The method of claim 30 wherein the non-linear analyzer comprises:

a hybrid parallel combination of a linear model with a non-linear model.

53. A computer method for modeling a non-linear, causal, multiple-input single-output, system or process, comprising the steps of:

(a) receiving and normalizing a working signal including control data inputs, resulting in preprocessed inputs;

(b) aligning the preprocessed inputs, resulting in time aligned inputs;

(c) using a plurality of filter units filtering the time aligned inputs, at least according to time, resulting in filtered states;

(d) generating an analyzer output based upon the filtered states, said generating employing a non-linear analyzer; and (e) converting the analyzer output to a model output that represents a prediction of the output of the multiple-input single-output dynamic system being modeled by the method, such that a general modeling of non-linear dynamic processes is provided.

* * * * *